United States Patent
Mitsui et al.

(10) Patent No.: US 10,512,083 B2
(45) Date of Patent: Dec. 17, 2019

(54) CONTROL METHOD AND MANAGEMENT APPARATUS

(71) Applicant: KYOCERA Corporation, Kyoto (JP)

(72) Inventors: Katsuhiro Mitsui, Kawasaki (JP); Kugo Morita, Yokohama (JP); Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 354 days.

(21) Appl. No.: 15/425,526

(22) Filed: Feb. 6, 2017

(65) Prior Publication Data
US 2017/0150506 A1 May 25, 2017

Related U.S. Application Data

(63) Continuation of application No. PCT/JP2015/072244, filed on Aug. 5, 2015.

(30) Foreign Application Priority Data

Aug. 8, 2014 (JP) .................................. 2014-163201

(51) Int. Cl.
*H04W 72/04* (2009.01)
*H04W 16/06* (2009.01)
(Continued)

(52) U.S. Cl.
CPC ......... *H04W 72/0453* (2013.01); *H04W 8/22* (2013.01); *H04W 16/06* (2013.01);
(Continued)

(58) Field of Classification Search
CPC ..... H04W 16/06; H04W 16/14; H04W 24/08; H04W 72/0453; H04W 72/0486; H04W 8/22; H04W 92/24
See application file for complete search history.

(56) References Cited

U.S. PATENT DOCUMENTS

2012/0071188 A1* 3/2012 Wang .................... H04W 16/14
455/509

FOREIGN PATENT DOCUMENTS

EP  1 883 258 A1  1/2008
EP     1883258 A1 *  1/2008 ............ H04W 16/06
(Continued)

OTHER PUBLICATIONS

PCT written opinion translation PCT/JP2015/072244 (Year: 2015).*
(Continued)

*Primary Examiner* — Rina C Pancholi
(74) *Attorney, Agent, or Firm* — Studebaker & Brackett PC

(57) ABSTRACT

A control method comprises: transmitting, by a first management apparatus included in a first network allocated with a first frequency band, to a second network allocated with a second frequency band, an allocation request signal for requesting allocation of a part of the second frequency band to the first network, the signal being generated on the basis of a usage state of the first frequency band, determining, by a second management apparatus included in the second network, on the basis of a usage state of the second frequency band, a bandwidth to be allocated to the first network out of the second frequency band and an allocated frequency band corresponding to the bandwidth; managing the allocated frequency band as unavailable; transmitting, an allocation request response signal including information indicating the allocated frequency band, to the first network; and managing the allocated frequency band as available in the first network.

19 Claims, 14 Drawing Sheets

(51) Int. Cl.
*H04W 8/22* (2009.01)
*H04W 16/14* (2009.01)
*H04W 24/08* (2009.01)

(52) U.S. Cl.
CPC ........... *H04W 16/14* (2013.01); *H04W 24/08* (2013.01); *H04W 72/0486* (2013.01)

(56) References Cited

FOREIGN PATENT DOCUMENTS

| EP | 2 306 763 A1 | 4/2011 | | |
| EP | 2306763 A1 * | 4/2011 | ........ | H04W 72/1252 |
| WO | 98/57516 A2 | 12/1998 | | |
| WO | WO-9857516 A2 * | 12/1998 | ........ | H04W 52/0225 |

OTHER PUBLICATIONS

3rd Generation Partnership Project; Technical Specification Group Radio Access Network; Study on Multi-RAT joint coordination (Release 13); 3GPP TR 37.870 V0.2.0; May 2014; pp. 1-15.
International Search Report issued in PCT/JP2015/072244; dated Oct. 13, 2015.
Written Opinion issued in PCT/JP2015/072244; dated Oct. 13, 2015.
The extended European search report issued by the European Patent Office dated Feb. 13, 2018, which corresponds to European Patent Application No. 15829394.4-1215 and is related to U.S. Appl. No. 15/425,526.

* cited by examiner

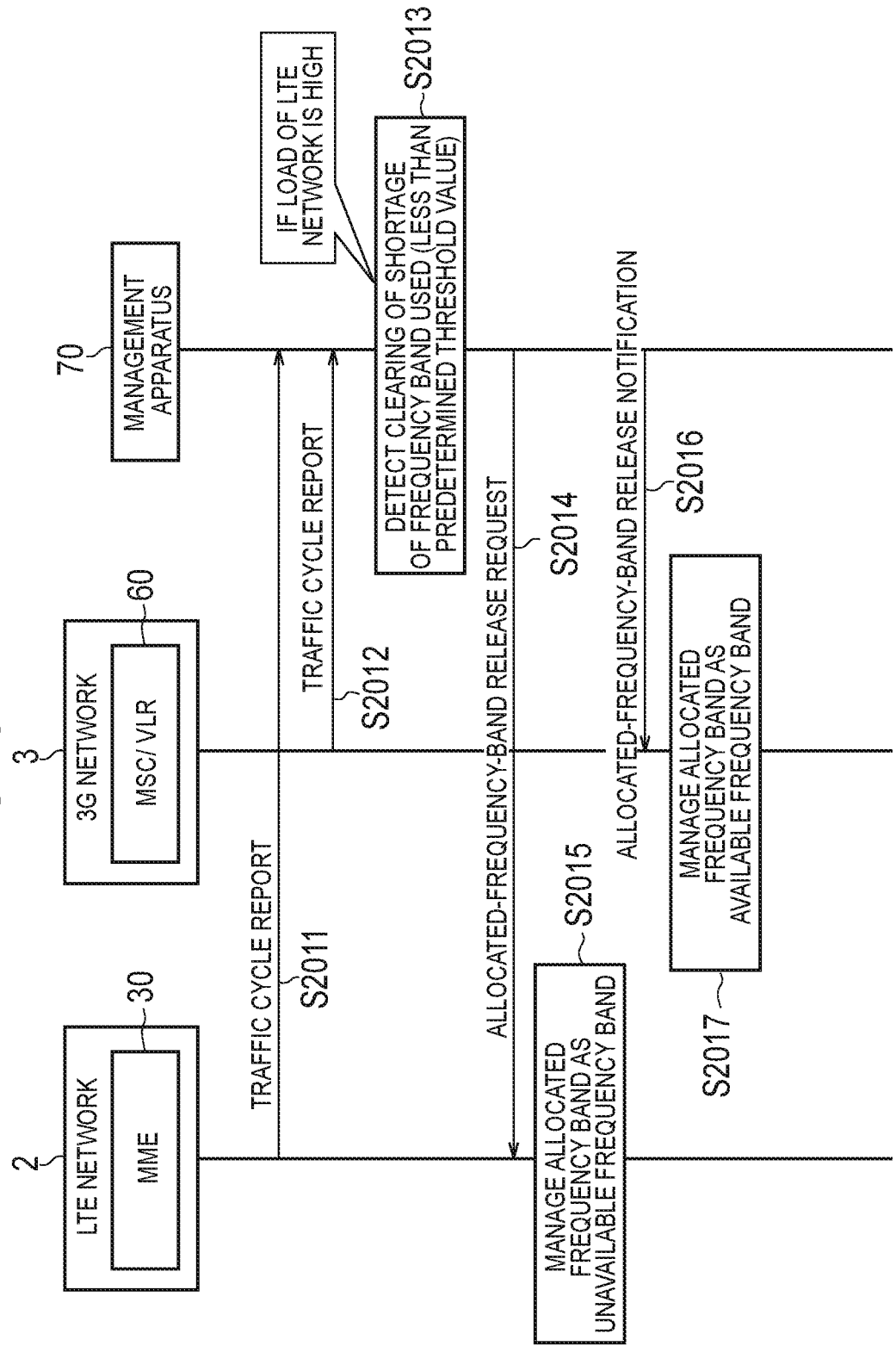

CONTROL METHOD AND MANAGEMENT APPARATUS

CROSS-REFERENCE TO RELATED APPLICATION

The present application is a continuation based on PCT Application No. PCT/JP2015/072244 filed on Aug. 5, 2015, which claims the benefit of Japanese Patent Application No. 2014-163201 filed on Aug. 8, 2014, entitled "CONTROL METHOD AND MANAGEMENT APPARATUS," the contents of which are incorporated by reference herein in their entirety.

TECHNICAL FIELD

The present application relates to a control method applied to a mobile communication system and to a management apparatus therefor.

BACKGROUND ART

In 3GPP (Third Generation Partnership Projects) which is a project aiming to standardize a mobile communication system, a radio access technology (RAT: Radio Access Technology) is standardized including GSM (registered trademark) (Global System for Mobile communications), UMTS (Universal Mobile Telecommunications System), and LTE (Long Term Evolution).

The RAT is operated in various forms by an operator. For example, a data communication service may be provided by an LTE network (or an LTE system) that supports the LTE, and a voice communication service may be provided by a 2G network (or a 2G system) that supports the GSM (registered trademark) or a 3G network (or a 3G system) that supports the UMTS.

At the same time, it is generally known that traffic of the data communication and traffic of the voice communications are different in the busiest time (Busy Hour). For example, the traffic tends to vary differently depending on each daily time zone. Therefore, the voice communication traffic may be less in a time zone with large data communication traffic, and vice versa.

For example, in a mobile communication system in which the data communication service is provided by an LTE network system and the voice communication service is provided by a 3G network, PS (Packet Switched) traffic and CS (Circuit Switched) traffic tend to vary differently.

Accordingly, depending on a certain time zone, there may be a case where there are large PS traffic and a high usage ratio of a frequency band allocated to the LTE network, and on the other hand, there are small CS traffic and a low usage ratio of a frequency band allocated to the 3G network.

Here, attention is paid to the difference in time-specific traffic between the PS and the CS, and in order to improve a frequency utilization efficiency, a frequency band re-allocation between a plurality of RATs (Spectrum Re-allocation) has been studied (see 3GPP technical report "TR 37.870 V0.2.0 (2014-05)" May 2014).

SUMMARY

A control method according to an embodiment of the present application is applied to a mobile communication system. The control method comprises transmitting, by a first management apparatus included in a first network allocated with a first frequency band, to a second network allocated with a second frequency band, an allocation request signal for requesting allocation of a part of the second frequency band to the first network. The signal being generated on the basis of a usage state of the first frequency band. The first network and the second network are included in the mobile communication system. The control method further comprises in response to receiving the allocation request signal, determining, by a second management apparatus included in the second network, on the basis of a usage state of the second frequency band, a bandwidth to be allocated to the first network out of the second frequency band and an allocated frequency band corresponding to the bandwidth. The control method further comprises managing, by the second management apparatus, as unavailable, the allocated frequency band out of the second frequency band. The control method further comprises transmitting, by the second management apparatus, an allocation request response signal including information indicating the allocated frequency band, to the first network. The control method further comprises managing, by the first management apparatus, on the basis of the information indicating the allocated frequency band and being included in the allocation request response signal, the allocated frequency band as available in the first network.

A control method according to an embodiment of the present application is applied to a mobile communication system. The control method comprises managing, by a management apparatus, a first frequency band allocated to a first network and a second frequency band allocated to a second network. The first network and the second network are included in the mobile communication system. The control method further comprises monitoring, by a management apparatus, a usage state of the first frequency band and the second frequency band. The control method further comprises determining, by the management apparatus, on the basis of the monitored usage state of the first frequency band and the second frequency band, an allocated frequency band that is a part of the second frequency band to be allocated to the first network. The control method further comprises transmitting, to the second network, an allocation request signal for requesting allocation to the first network, the signal being generated on the basis of the determined allocated frequency band. The control method further comprises notifying, by the management apparatus, the first network that the allocated frequency band is available in the first network.

BRIEF DESCRIPTION OF THE DRAWINGS

FIG. 15 is a sequence diagram illustrating an operation procedure of a frequency band release process according to the second embodiment.

DESCRIPTION OF THE EMBODIMENT

Mean for allocating a frequency band through cooperation between a plurality of RATs has not been revealed.

Accordingly, an object of the present application is to provide a control method and management apparatus with which it is possible to establish cooperation between RATs to enable dynamic allocation control of a frequency band from one RAT to a different RAT.

An embodiment of the present application (hereinafter, a present embodiment) will be described with reference to the drawings, below.

First Embodiment (1-1) System Configuration

Figure 1:
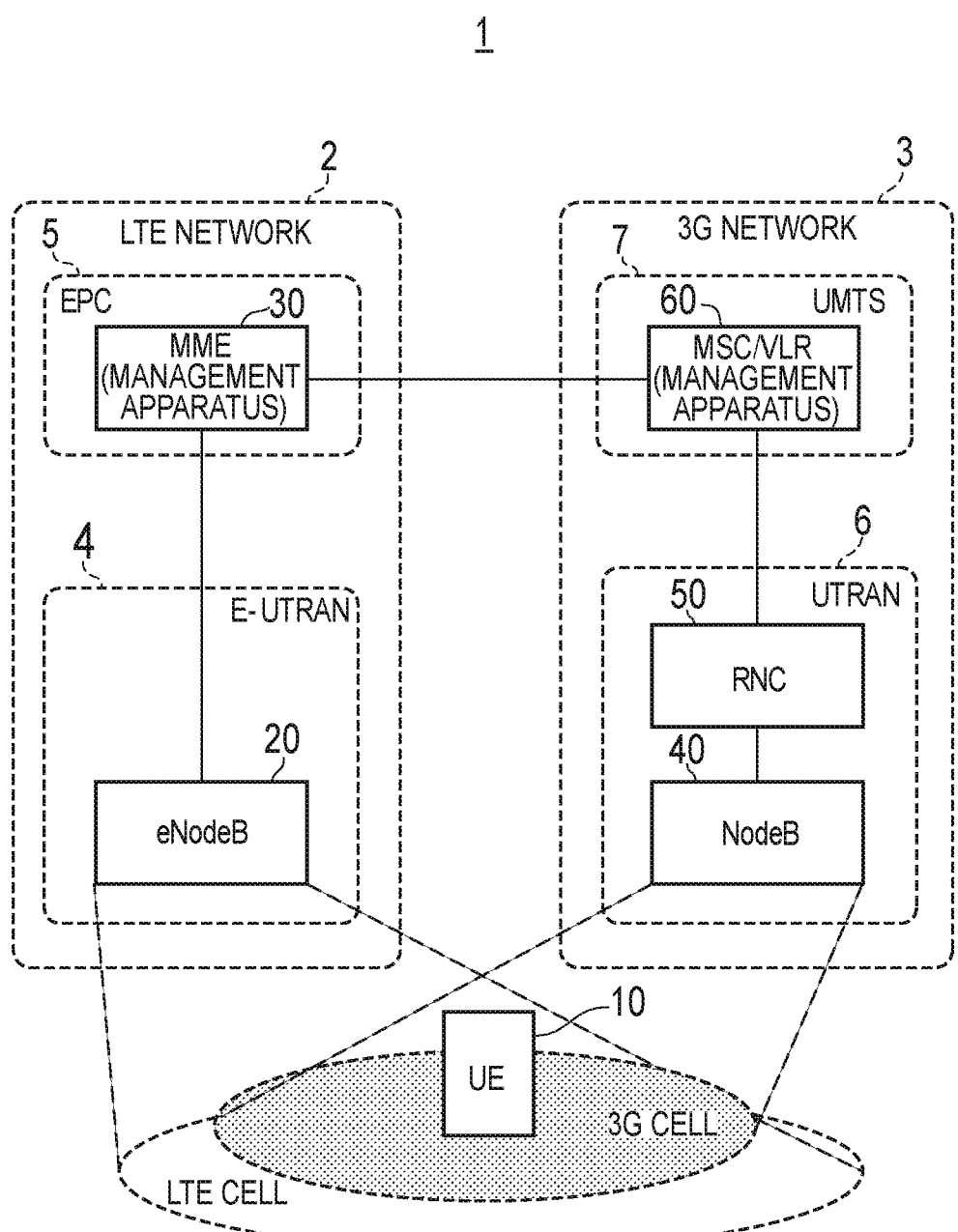
FIG. 1 is a configuration diagram of a mobile communication system according to a first embodiment.

FIG. 1 is a configuration diagram of a mobile communication system according to a first embodiment.

As illustrated in FIG. 1, a mobile communication system 1 according to the first embodiment has an LTE network 2 (first network), a 3G network 3 (second network), and a UE (User Equipment) 10.

The LTE network 2 includes an E-UTRAN (Evolved-UMTS Terrestrial Radio Access Network) 4 that is a radio access network of an LTE system, and an EPC (Evolved Packet Core) 5 that is a core network corresponding to the LTE system. The E-UTRAN 4 include an eNodeB 20. The EPC5 includes an MME (Mobility Management Entity) 30.

The 3G network 3 includes a UTRAN 6 that is a radio access network of a 3G system, and a UMTS 7 that is a core network corresponding to the 3G system. The UTRAN 6 includes a NodeB 40 and an RNC (Radio Network Controller) 50. The UMTS 7 includes an MSC/VLR (Mobile Switching Center/Visitor Location Register) 60.

The UE 10 is a mobile station capable of performing communication by the LTE system and the 3G system. The UE 10 is a mobile communication device, for example, including a smart phone, a tablet terminal, a cell phone, or a notebook computer. When existing in a cell covered by the eNodeB 20 (LTE cell) and in a cell covered by the NodeB 40 (3G cell), the UE 10 performs radio communication with each of the eNodeB 20 and the NodeB 40.

The eNodeB 20 is a base station of the LTE system. The eNodeB 20 is connected mutually via an X2 interface. The eNodeB 20 is connected via an S1 interface to the MME 30.

The eNodeB 20 manages one or a plurality of LTE cells, and performs radio communication with the UE 10 which establishes a connection with a cell of the eNodeB 20. The eNodeB 20 has a radio resource management (RRM) function, a routing function of user data, a measurement control function for mobility control and scheduling, and the like. The "cell" is used as a term indicating a smallest unit of a radio communication area, and is also used as a term indicating a function of performing radio communication with the UE 10. Any number of eNodeBs 20 may be included in the LTE network 2.

The MME 30 performs various types of mobility control and the like for the UE 10. The MME 30 is connected via the S1 interface to the eNodeB 20.

In the first embodiment, the MME 30 is a management apparatus (first management apparatus) configured to manage a frequency band allocated to the LTE network 2 and to perform control of a frequency band allocation to a different network (3G network 3) in cooperation. It is noted that a function of the management apparatus may be provided in the eNodeB 20, OAM (Operation Administration and Maintenance), or a different device included in the LTE network 2.

The NodeB 40 is a base station of the 3G system. The NodeB 40 is connected via an Iub interface to the RNC 50. The NodeB 40 manages one or a plurality of 3G cells, and performs radio communication with the UE 10 which establishes a connection with a cell of the NodeB 40. Any number of Nodes 40 may be included in the 3G network 3.

The RNC 50 controls radio communication between the UE 10 and the NodeB 40.

The MSC/VLR 60 performs a line switching process for voice communication of the UE 10. The MSC/VLR 60 is connected via an Iu-CS interface to the RNC 50.

In the first embodiment, the MSC/VLR 60 is a management apparatus (second management apparatus) configured to manage a frequency band allocated to the 3G network 3 and to perform control of a frequency band allocation to a different network (LTE network 2) in cooperation. It is noted that a function of the management apparatus may be provided in the RNC 50, OAM or a different device included in the 3G network 3.

(1-2) Operation Overview

Figure 2:
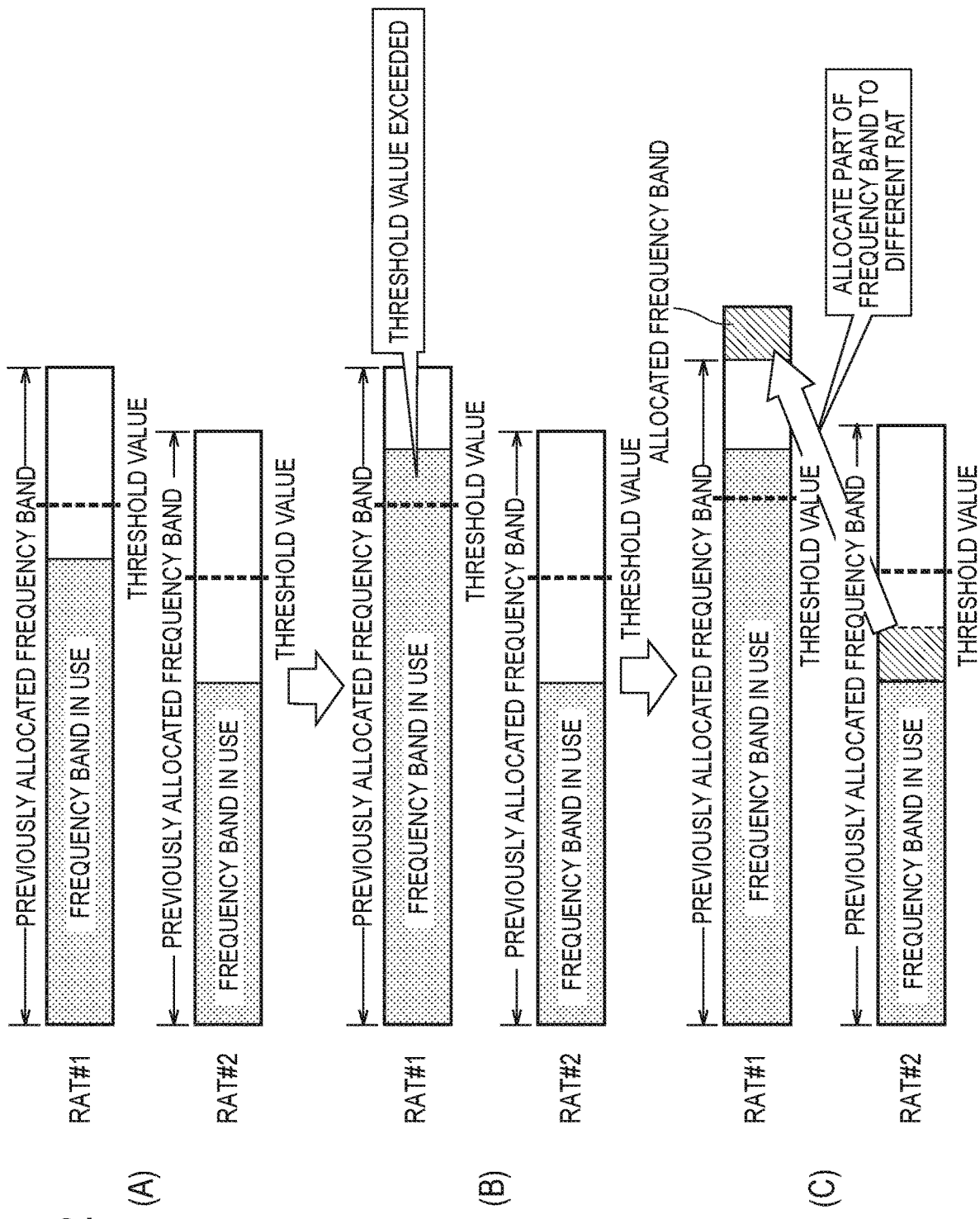
FIG. 2 is a diagram for describing an operation overview of the mobile communication system according to the first embodiment.

FIG. 2 is a diagram for describing an operation overview of the mobile communication system 1 according to the first embodiment.

As illustrated in FIG. 2, RAT #1 and RAT #2 are allocated with a frequency band, respectively. A previously allocated frequency band is set with a predetermined threshold value. For example, networks that support the RAT #1 and the RAT #2 are the LTE network 2 and the 3G network 3, respectively. It is noted that in the embodiment of the present application, the frequency band is an example of a radio resource.

In a state illustrated in FIG. 2(A), frequency bands being used (frequency band in use) in both the RAT #1 and the RAT #2 are less than a threshold value.

A state illustrated in FIG. 2(B) is a state obtained through transition from FIG. 2(A). As illustrated in FIG. 2(B), the frequency band in use in the RAT #1 exceeds the threshold value. On the other hand, the frequency band in use in the RAT #2 is less than the threshold value.

A state illustrated in FIG. 2(C) is a state obtained through transition from FIG. 2(B). As illustrated in FIG. 2(C), in the first embodiment, a part of the frequency band in the RAT #2 is allocated to the RAT #1. Thus, the RAT #1 is capable of using the frequency band (allocated frequency band) allocated by the RAT #2. At this time, in the RAT #1, a new threshold value based on the frequency band obtained by adding the allocated frequency band to the previously allocated frequency band may be set. It is noted that in the RAT #2, the allocated frequency band may be determined on the basis of a difference between a frequency band that is not used and is less than the threshold value in the RAT #2 and a frequency band expected to be allocated to the UE 10 that exists in a cell subordinate to the RAT #2 and that is not in communication. Specifically, for example, if the frequency band that is not used and is less than the threshold value in the RAT #2 is smaller than the frequency band expected to be allocated to the UE 10 not in communication, it may be possible that a part of the frequency band of the RAT #2 is not allocated to the RAT #1.

Thus, according to the first embodiment, the RAT (RAT #2) having a low usage rate of the frequency band is capable of allocating, on the basis of a usage state of the frequency band, a part of the previously allocated frequency band to the RAT (RAT #1) having a high usage rate of the frequency band.

(1-3) Function Block

<MME (Management Apparatus)>

Figure 3:
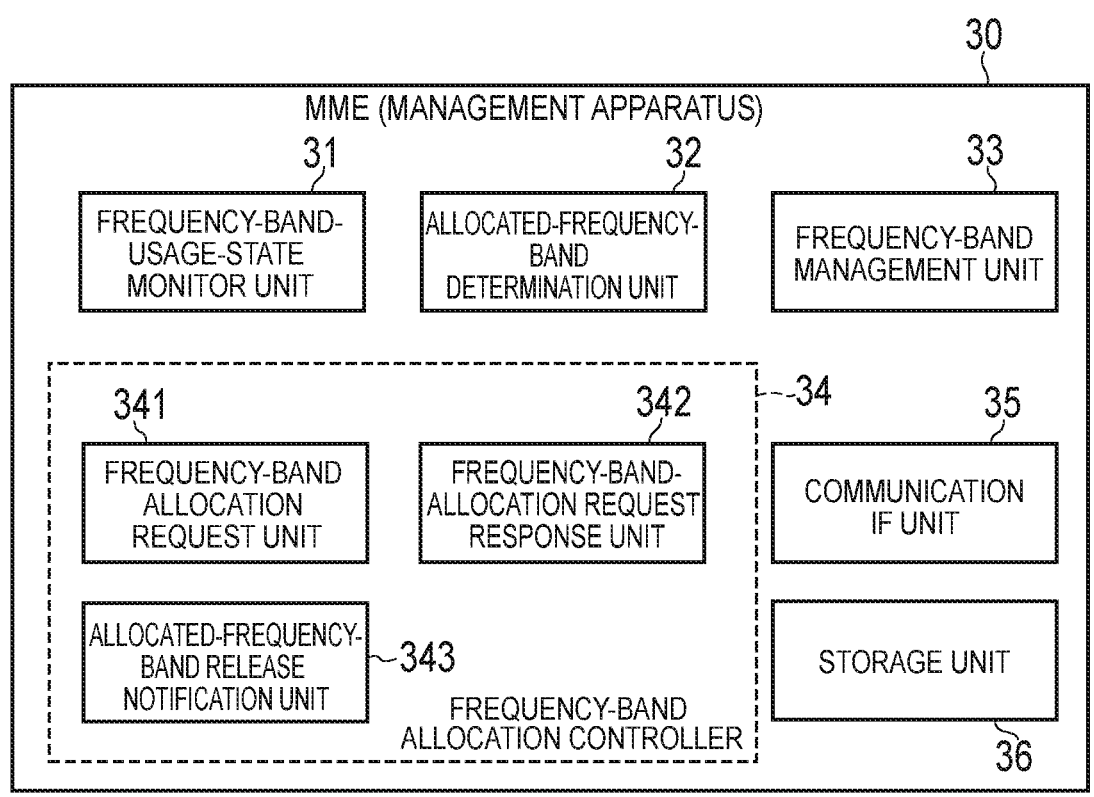
FIG. 3 is a block diagram of MME (management apparatus) according to the first embodiment.

FIG. 3 is a block diagram of the MME 30 (management apparatus) according to the first embodiment. As illustrated in FIG. 3, the MME 30 that configured to function as a management apparatus includes a frequency-band-usage-state monitor unit 31, an allocated-frequency-band determination unit 32, a frequency-band management unit 33, a frequency-band allocation controller 34, a communication IF (Interface) unit 35, and a storage unit 36. The frequency-band allocation controller 34 includes a frequency-band-allocation request unit 341, a frequency-band-allocation request response unit 342, and an allocated-frequency-band release notification unit 343.

The frequency-band-usage-state monitor unit 31 monitors a usage state of a frequency band in its own network. The usage rate of the frequency band is an increase or a decrease in bandwidth in use relative to an allocated frequency band, for example. The frequency-band-usage-state monitor unit 31 monitors whether or not the rate exceeds a predetermined threshold value in the frequency band. It is noted that the frequency-band-usage-state monitor unit 31 may monitor a ratio of the bandwidth in use relative to the frequency band. The frequency-band-usage-state monitor unit 31 monitors a usage state of the frequency band, on the basis of a unit of any area formed by one or more cells accommodated in the base station included in its own network. The area refers to a single cell, a plurality of cells (sectors), a location registration area (tracking area (TA)), a base station (all the cells accommodated by the base station), an area formed by a plurality of base stations, or a whole of a network. It is noted that the usage state of the frequency band to be monitored by the frequency-band-usage-state monitor unit 31 may be acquired by the MME 30 (management apparatus), and may be obtained from the OAM, for example.

Upon reception of an allocation request signal described later from a different network in cooperation, the allocated-frequency-band determination unit 32 determines, on the basis of the usage state of the frequency band of its own network, a bandwidth to be allocated to the different network and an allocated frequency band corresponding to the bandwidth, from an available allocated frequency band out of frequency bands allocated to its own network.

The frequency-band management unit 33 manages a frequency band available in its own network and an unavailable frequency band.

The frequency-band allocation controller 34 controls allocation of a frequency band between the networks in cooperation.

The frequency-band-allocation request unit 341 generates, on the basis of the usage state of the frequency band allocated to its own network, an allocation request signal for requesting allocation, to its own network, of a part of the frequency band allocated to the different network in cooperation. The frequency-band-allocation request unit 341 transmits the generated allocation request signal, via the communication IF unit 35, to the different network.

The frequency-band-allocation request response unit 342 generates, as a response to the allocation request signal transmitted from the different network in cooperation, an allocation request response signal including the allocated frequency band determined by the allocated-frequency-band determination unit 32. The frequency-band-allocation request response unit 342 transmits the generated allocation request response signal, via the communication IF unit 35, to the different request-source network.

The allocated-frequency-band release notification unit 343 notifies, via the communication IF unit 35, the different network of release of the allocated frequency band, if the allocated frequency band is allocated from the different network and the frequency band in use out of the frequency band of its own network is less than a predetermined threshold value.

The communication IF unit 35 is a communication interface such as a wired LAN (Local Area Network) or a wireless LAN, and the like.

The storage unit 36 is configured by a memory or a hard disk or the like, and stores various types of information.

<MSC/VLR (Management Apparatus)>

Figure 4:
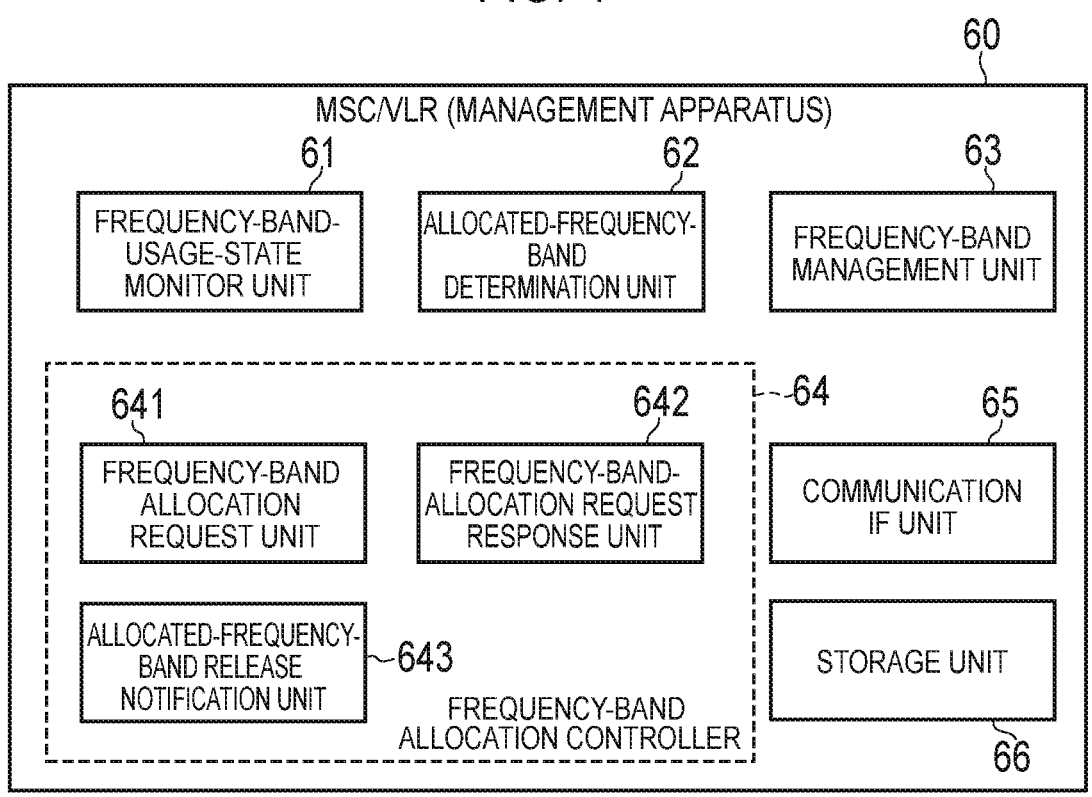
FIG. 4 is a block diagram of MSC/VLR (management apparatus) according to the first embodiment.

FIG. 4 is a block diagram of the MSC/VLR 60 (management apparatus) according to the first embodiment. As illustrated in FIG. 4, the MSC/VLR 60 configured to function as a management apparatus includes a frequency-band-usage-state monitor unit 61, an allocated-frequency-band determination unit 62, a frequency-band management unit 63, a frequency-band allocation controller 64, a communication IF unit 65, and a storage unit 66. The frequency-band allocation controller 64 includes a frequency-band-allocation request unit 641, a frequency-band-allocation request response unit 642, and an allocated-frequency-band release notification unit 643. The above-described functions provided in the MSC/VLR 60 corresponds to the above-described functions provided in the MME 30, respectively.

(1-4) Operation Sequence (Frequency-Band Allocation Process)

Figure 5:
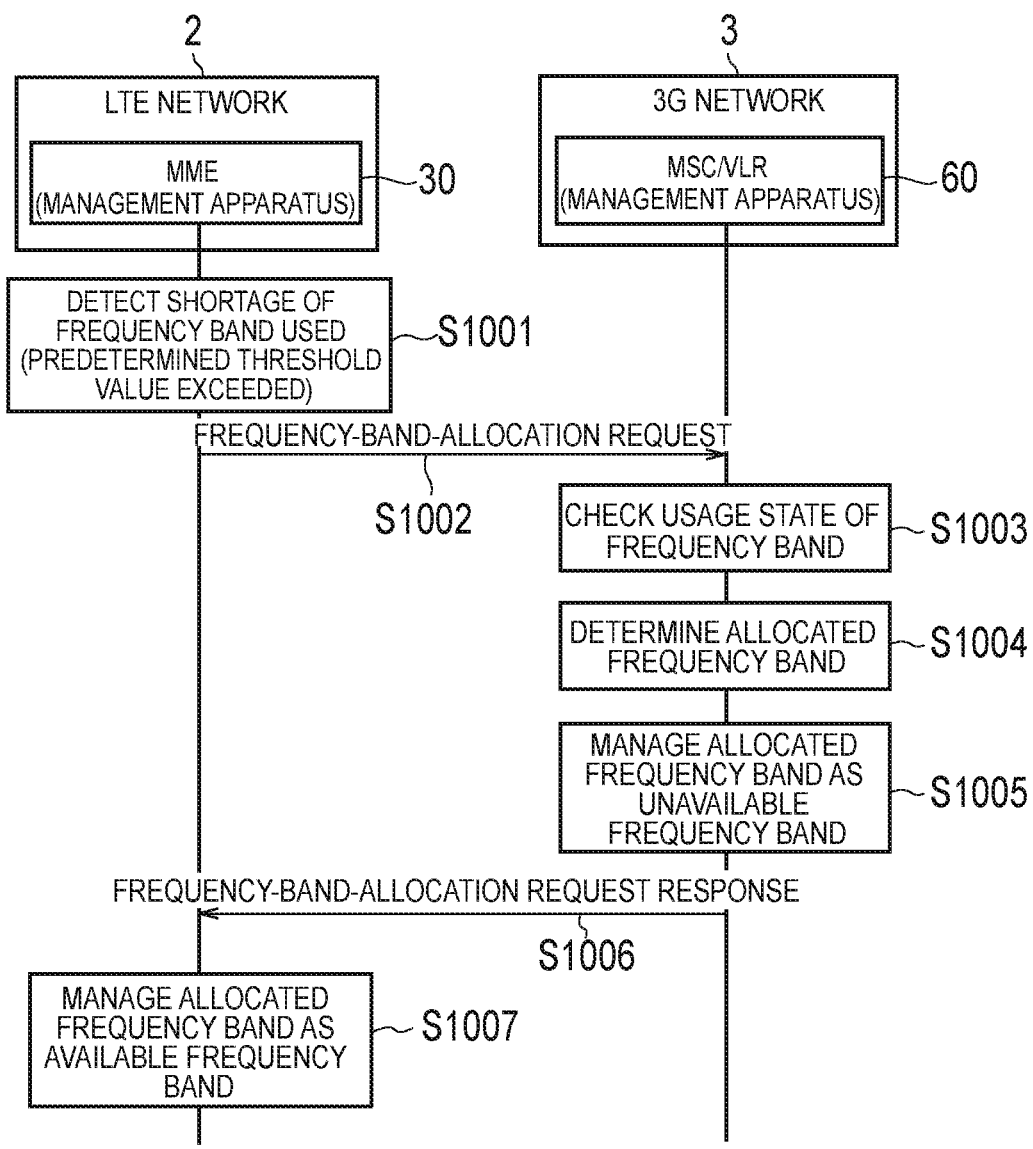
FIG. 5 is a sequence diagram illustrating an operation procedure of a frequency-band allocation process according to the first embodiment.

FIG. 5 is a sequence diagram illustrating an operation procedure of a frequency-band allocation process according to the first embodiment. In an example of FIG. 5, there is illustrated a case where the LTE network 2 that has high traffic (frequency band usage rate is high) is allocated with a part of the frequency band of the 3G network 3 that has low traffic (frequency band usage rate is low).

In step S1001, the frequency-band-usage-state monitor unit 31 of the MME 30 (management apparatus) detects shortage of the frequency band used in the LTE network 2. Specifically, the frequency-band-usage-state monitor unit 31 detects that the bandwidth relative to the frequency band allocated to the LTE network exceeds a predetermined threshold value. The frequency-band-usage-state monitor unit 31 notifies the frequency-band-allocation request unit 341 that the predetermined threshold value has been exceeded.

In step S1002, the MME 30 (management apparatus) generates, on the basis of the notification from the frequency-band-allocation request unit 341, a frequency-band allocation request signal for requesting allocation, to the LTE network 2, of a part of the frequency band allocated to the 3G network 3 in cooperation. The frequency-band allocation request signal may include all or a part of: area identification information identifying an area in the LTE network 2 (that is, a high-traffic area) to which the frequency needs to be allocated; a communication type in the area (for example, data communication or voice communication); a bandwidth requested to be allocated; and area identification information of an area in the 3G network 3 requested to be allocated. The area identification information is eNB ID, TAI (Tracking Area ID)/LAI (Location Area ID) or a cell ID, and the like, for example. The bandwidth requested to be allocated is a bandwidth corresponding to the amount in excess of the predetermined threshold value in the LTE network 2, for example. A relationship between the area identification information in the LTE network 2 and the area identification information in the 3G network is that at least a part of a coverage of an area corresponding to each of the area identification information overlaps.

It is noted that the frequency-band allocation request signal may include a plurality of area identification information. Here, the frequency allocation request signal including a plurality of area identification information may be generated if the number of each of the areas where the bandwidth in use has exceeded a predetermined threshold value exceeds a predetermined number. Specifically, for example, if there are a plurality of cells in which the bandwidth in use exceeds a predetermined threshold value, the plurality of cells are aggregated into an upper-layer area (for example, Tracking Area or an area accommodated by a base station) unit obtained by aggregating the plurality of cells, and thereafter, the frequency band allocation request is transmitted. Thus, it is possible to reduce the number of frequency-band allocation request signals generated.

Further, the frequency-band allocation request signal may include area identification information of the upper layer of the plurality of area identification information. Thus, it is possible to reduce the number of area identification information included in the frequency-band allocation request signal and the number of generated frequency-band allocation request signals.

Thus, a timing at which the frequency-band allocation request signal is transmitted is set to a timing at which a predetermined threshold value in a plurality of areas is exceeded, whereby it is possible to reduce a signal amount between the networks.

Meanwhile, regarding the frequency allocation request signal including a plurality of area identification information, if out of the plurality of areas, the number of areas where the bandwidth in use exceeds a predetermined value is less than a predetermined number, the frequency allocation request signal is generated at each time the bandwidth in use exceeds a predetermined threshold value in each area.

The frequency-band-allocation request unit 341 transmits the generated frequency-band allocation request signal, via the communication IF unit 35, to the 3G network 3.

In step S1003, the frequency-band-usage-state monitor unit 61 of the MSC/VLR 60 (management apparatus) checks, upon reception of the frequency-band allocation request signal from the LTE network 2, the usage state of the frequency band allocated to the 3G network 3. The frequency-band-usage-state monitor unit 61 checks, if the area identification information in the 3G network 3 is included in the allocation request signal, the usage state of the frequency band corresponding to the area identification information. It is noted that if the area identification information in the LTE network 2 is included but the area identification information in the 3G network 3 is not included in the allocation request signal, the frequency-band-usage-state monitor unit 61 refers to an external server that manages an area configuration of each network, for example, so as to designate, on the basis of the area identification information in the LTE network 2, the area identification information in the 3G network 3. It is noted that the management apparatus in one network (e.g. MME 30) may convert the area identification information included in the frequency-band allocation request signal, into information interpretable in a management apparatus of the other network (e.g. MSC/VLR 60). Further, the management apparatus in one network (e.g. MME 30) may convert the area identification information included in the frequency-band allocation request signal, into information that can be used commonly in the respective networks.

In step S1004, the allocated-frequency-band determination unit 62 determines, on the basis of the usage state of the frequency band allocated to the 3G network 3, the bandwidth to be allocated to the LTE network 2 and the allocated frequency band corresponding to the bandwidth, out of the frequency bands allocated to the 3G network 3. The allocated-frequency-band determination unit 62 determines, as the allocated frequency band, a difference between the frequency band allocated to the 3G network 3 and a frequency to be allocated to a part of a standby mobile stations existing in the area corresponding to the frequency band in use and the area identification information. It is noted that the frequency-band management unit 63 may set a minimally required frequency band that is a frequency band minimally required in the 3G network 3, or a largest allocatable frequency band that is a maximum frequency band value of the allocated frequency band. The allocated-frequency-band determination unit 62 may determine the allocated frequency band in a bandwidth between the minimally required frequency band and the largest allocatable frequency band.

In step S1005, the frequency-band management unit 63 manages, as the unavailable frequency band, the allocated frequency band determined by the allocated-frequency-band determination unit 62.

In step S1006, the frequency-band-allocation request response unit 642 generates a frequency band allocation request response signal including information indicating the determined allocated frequency band. The frequency band allocation request response signal may include all or a part of: an allocation start timing of the allocated frequency band; an allocation end timing; an allocation cycle; an allocation period; and an offset timing.

The frequency-band-allocation request response unit 642 transmits the generated frequency band allocation request response signal, via the communication IF unit 65, to the LTE network 2.

In step S1007, the frequency-band management unit 33 of the MME 30 (management apparatus) manages, as the frequency band available in the LTE network 2, the allocated frequency band included in the received frequency band allocation request response signal. The frequency-band management unit 33 sets so that the allocated frequency band is used in an area around a high-load area in the LTE network 2.

The above operation procedure enables a dynamic allocation of a part of the frequency band of the other network (3G network 3) having a sufficient frequency band to the network (LTE network 2) in which the available frequency band is running short.

It is noted that the MME 30 (management apparatus) and the MSC/VLR 60 (management apparatus) in the example of FIG. 5 may be interchangeably operated.

It is noted that the MSC/VLR 60 (management apparatus) may transmit, on the basis of the usage state of the frequency band allocated to the 3G network 3, an allocation availability notification indicating that it is possible to allocate a part of the 3G network 3 to the LTE network 2, to the LTE network 2. That is, in a state where out of the frequency bands allocated to the 3G network 3, a small amount of band is used (a sufficient state), it is possible to notify that there is a frequency band allocatable to the other network. In this case, the MME (management apparatus 30) generates a frequency band allocation request upon reception of the allocation availability notification, and executes the operation of step S1002.

(1-5) Process Procedure (Frequency-Band Allocation Process)

<Device Configured to Allocate Part of Frequency Band>

Figure 6:
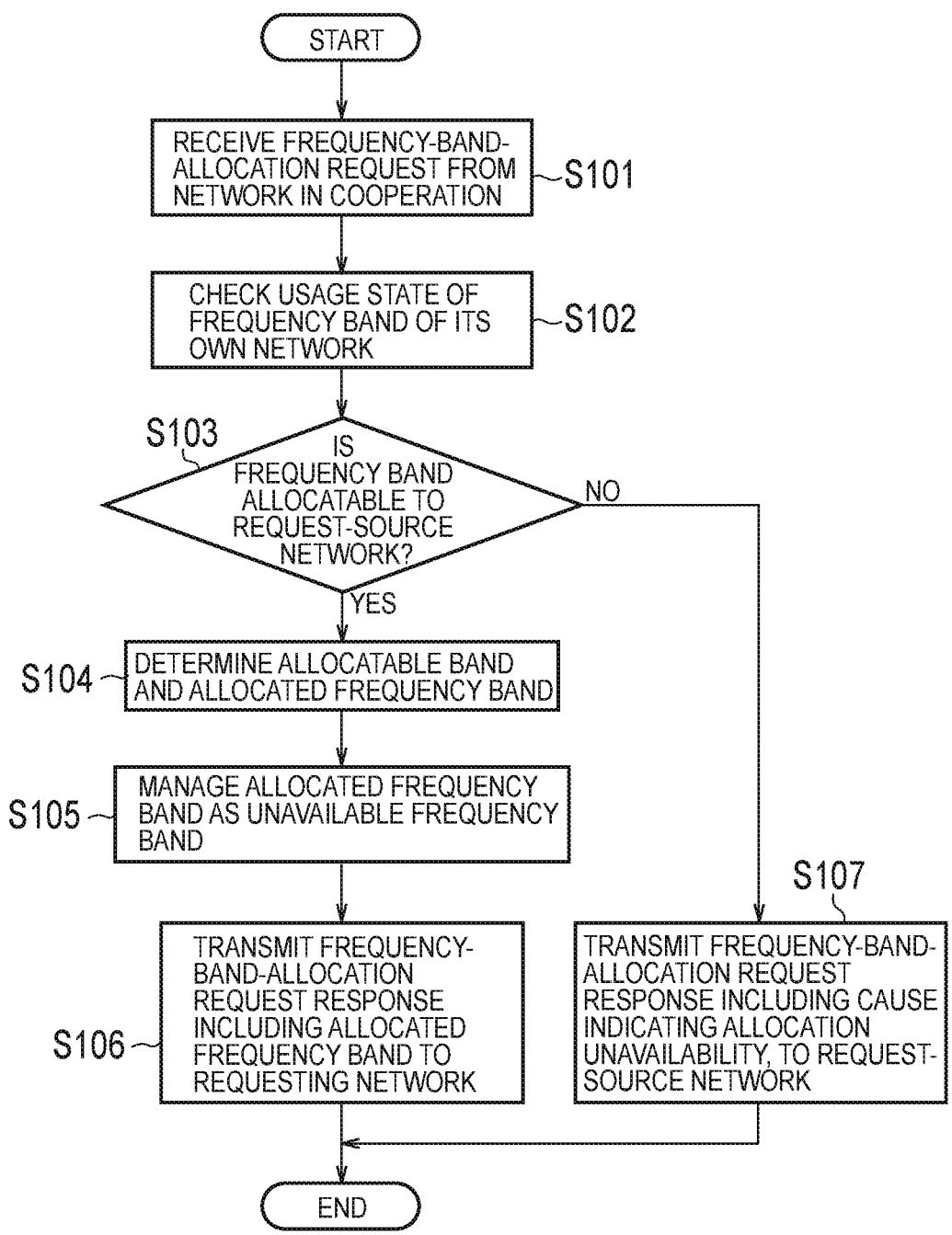
FIG. 6 is a flowchart diagram illustrating a frequency-band allocation process procedure of a management apparatus configured to allocate a part of the frequency band according to the first embodiment.

FIG. 6 is a flowchart diagram illustrating the frequency-band allocation process procedure of the management apparatus configured to allocate a part of the frequency band according to the first embodiment. The management apparatus configured to allocate a part of the frequency band, corresponds to the MSC/VLR 60 illustrated in FIG. 5.

In step S101, the communication IF unit 65 of the management apparatus (MSC/VLR 60) receives the frequency-band allocation request signal from the different network in cooperation (LTE network 2).

In step S102, the frequency-band-usage-state monitor unit 61 checks the usage state of the frequency band allocated to its own network (3G network 3).

In step S103, the allocated-frequency-band determination unit 62 determines, on the basis of the usage state of a frequency band, whether it is possible to allocate the frequency band to the network (LTE network 2) from which the frequency-band allocation request signal is transmitted.

If it is determined that it is possible to allocate the frequency band (YES in step S103), in step S104, the allocated-frequency-band determination unit 62 determines the allocatable bandwidth and the allocated frequency band.

In step S105, the frequency-band management unit 63 manages the determined allocated frequency band as the frequency unavailable in its own network (3G network 3).

In step S106, the frequency-band-allocation request response unit 642 transmits a frequency band allocation request response signal including information indicating the allocated frequency band, via the communication IF unit 65, to the LTE network 2.

On the other hand, in step S103, if it is determined that it is not possible to allocate the frequency band (NO in step S103), in step S107, the frequency-band-allocation request response unit 642 transmits the frequency band allocation request response signal including a cause indicating that the allocation of a part of the frequency band is not possible, via the communication IF unit 65, to the LTE network 2.

<Device Allocated with Part of Frequency Band>

Figure 7:
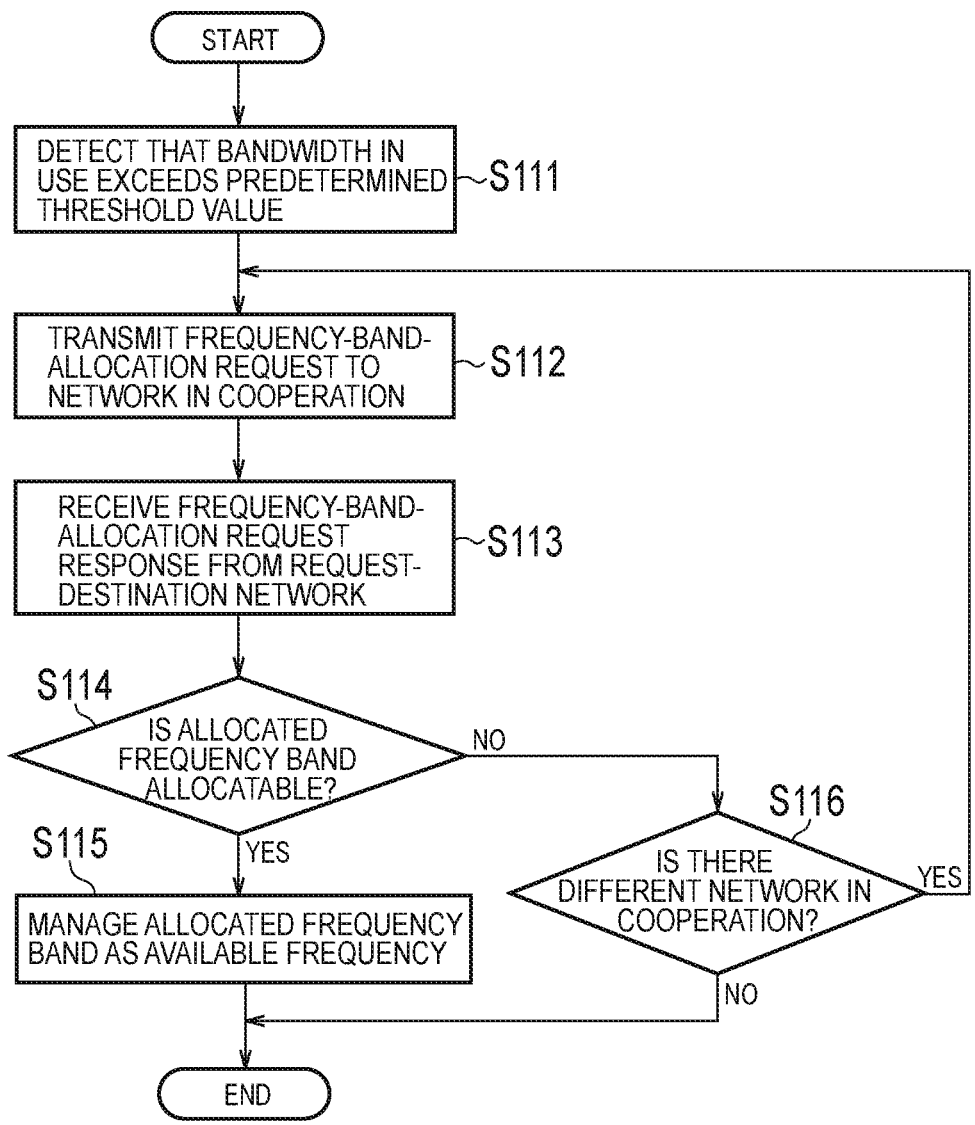
FIG. 7 is a flowchart diagram illustrating a frequency-band allocation process procedure of a management apparatus allocated with a part of the frequency band according to the first embodiment.

FIG. 7 is a flowchart diagram illustrating the frequency-band allocation process procedure of the management apparatus allocated with a part of the frequency band according to the first embodiment. The management apparatus allocated with a part of the frequency band corresponds to the MME 30 illustrated in FIG. 5.

In step S111, the frequency-band-usage-state monitor unit 31 of the management apparatus (MME 30) detects that a bandwidth in use relative to the frequency band allocated to its own network (LTE network 2) exceeds a predetermined threshold value.

In step S112, the frequency-band-allocation request unit 341 transmits a frequency-band allocation request signal to the different network in cooperation (3G network 3).

In step S113, the communication IF unit 35 receives a frequency band allocation request response signal from the network (3G network 3) to which the frequency band allocation is requested.

In step S114, the frequency-band management unit 33 determines, on the basis of a cause included in the frequency band allocation request response signal, whether or not it is possible to allocate the allocated frequency band.

If the cause included in the frequency band allocation request response signal indicates unavailability of the allocated frequency band (NO in step S114), it is determined in step S116 whether or not there is a different network in cooperation.

If the different network in cooperation is present (YES in step S116), a process in step S112 is executed.

On the other hand, if the different network in cooperation is not present (NO in step S116), the process is ended.

In step S114, if the information indicating the allocated frequency band is included in the frequency band allocation request response signal (YES in step S114), in step S115, the frequency-band management unit 33 manages the allocated frequency band as the frequency band available in its own network (LTE network 2).

(1-6) Operation Sequence (Frequency Band Release Process)

Figure 8:
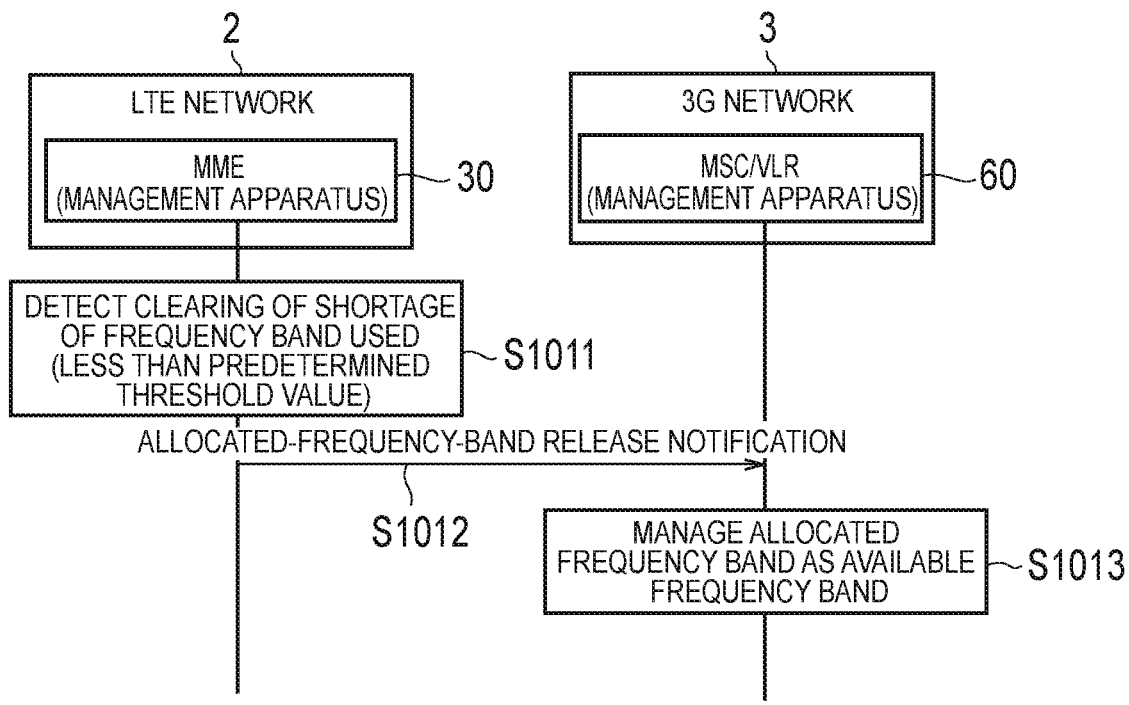
FIG. 8 is a sequence diagram illustrating an operation procedure of a frequency band release process according to the first embodiment.

FIG. 8 is a sequence diagram illustrating an operation procedure of a frequency band release process according to the first embodiment. In an initial state of FIG. 8, the LTE network 2 is allocated, by the 3G network 3, with the allocated frequency band.

In step S1011, the frequency-band-usage-state monitor unit 31 of the MME 30 configured to function as a management apparatus detects that the shortage of the frequency band in use is cleared. Specifically, the frequency-band-usage-state monitor unit 31 detects that the bandwidth relative to the frequency band allocated to the LTE network 2 has become less than the predetermined threshold value. The frequency-band-usage-state monitor unit 31 notifies the allocated-frequency-band release notification unit 343 that the predetermined threshold value has been exceeded.

In step S1012, the allocated-frequency-band release notification unit 343 transmits the allocated frequency band release notification to release the allocated frequency band, to the 3G network 3.

In step S1013, the frequency-band management unit 63 of the MSC/VLR 60 configured to function as a management apparatus manages, on the basis of the received allocated frequency band release notification, the allocated frequency band as the frequency band available in the 3G network 3.

It is noted that, as a trigger to release the allocated frequency band, if it is detected that the frequency band available in its own network (for example, the 3G network 3) in which a part of the frequency band is allocated to the different network (for example, the LTE network 2) is less than a predetermined threshold value, the MSC/VLR 60 (management apparatus) may send, to the MME 30 (management apparatus), a request to release the allocated frequency band (allocated-frequency release request). In this case, in the allocated-frequency release request, at least one of: an address of a base station or the like in which the allocated frequency band is to be used; the frequency band; and a time period during which the use is prohibited, is included. It is noted that allocated frequency band subject to the allocated-frequency release request may cover not only all the allocated frequency bands allocated to the different network (e.g. LTE network 2), but also a part of the allocated frequency band. Further, a predetermined threshold value in this case may be set in accordance with a transfer time of a message between the networks. For example, if the transfer time is long, it is so set that an upper limit of the threshold value is increased. It is noted that if the transfer time is too long, the network may not be selected as the target network in cooperation.

(1-7) Process Procedure (Frequency Band Release Process)

Figure 9:
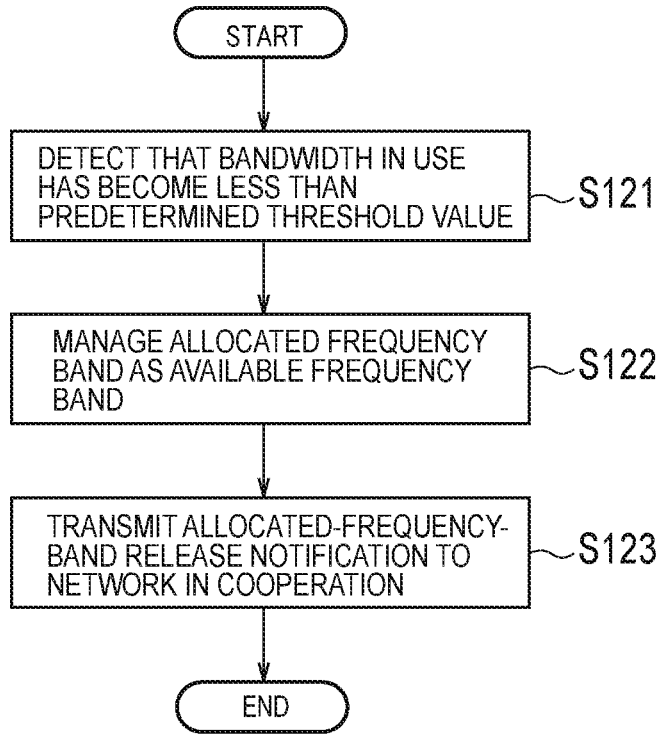
FIG. 9 is a flowchart diagram illustrating a frequency band release process procedure of the management apparatus allocated with a part of the frequency band according to the first embodiment.

FIG. 9 is a flowchart diagram illustrating the frequency band release process procedure of the management apparatus allocated with a part of the frequency band according to the first embodiment. The management apparatus allocated with a part of the frequency band corresponds to the MME 30 illustrated in FIG. 8.

In step S121, the frequency-band-usage-state monitor unit 31 of the MME 30 configured to function as a management apparatus detects that the shortage of the frequency band in use is cleared. Specifically, the frequency-band-usage-state monitor unit 31 detects that the bandwidth relative to the frequency band allocated to the LTE network 2 has become less than the predetermined threshold value.

In step S122, the frequency-band management unit 33 manages the allocated frequency band, as the unavailable frequency band.

In step S123, the allocated-frequency-band release notification unit 343 transmits the allocated frequency band release notification to release the allocated frequency band, to the 3G network 3.

(1-8) Allocation of Frequency Band in Consideration of Interference

Figure 10:
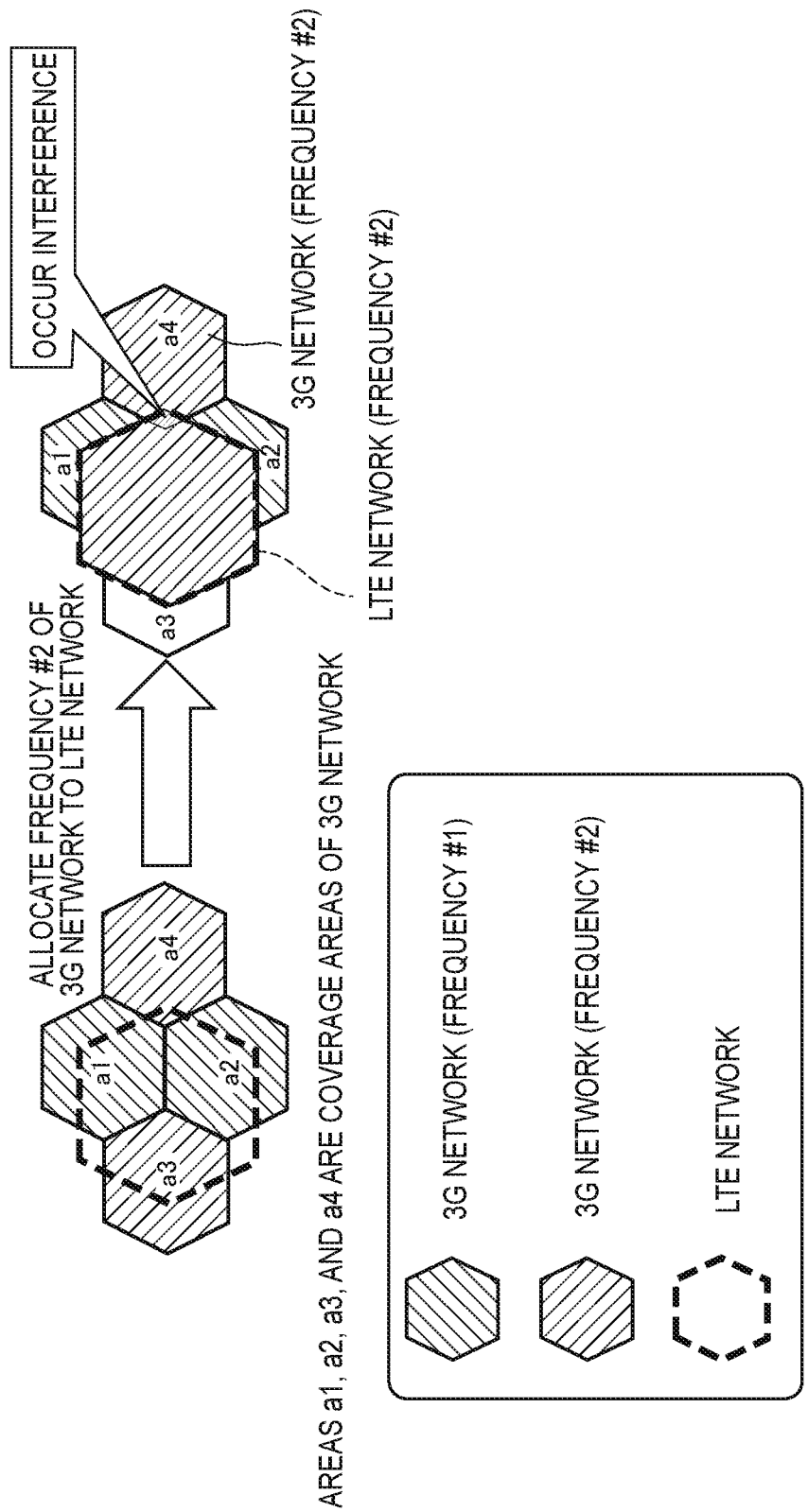
FIG. 10 is a diagram for describing a case where interference occurs during the frequency-band allocation process according to the first embodiment.

FIG. 10 is a diagram for describing a case where interference occurs during the frequency-band allocation process according to the first embodiment. As illustrated in FIG. 10, if the coverage area of the 3G network 3 and that of the LTE network 2 partially overlap, for example, when an area a3 of the 3G network 3 (frequency #2) is allocated to the LTE network 2, interference occurs between the LTE network (frequency #2) and the 3G network (frequency #2).

Therefore, if the interference is detected in the area in which the allocated frequency band is used (the LTE network 2 in FIG. 10), the eNodeB 20 notifies the MME 30 (management apparatus) of the detection of the interference and the area in which the interference has occurred.

Next, if the area in which the interference is detected (has occurred) is an area allocated with the allocated frequency band or an area therearound, the MME 30 (management apparatus) changes the area in which the allocated frequency band is used, or prohibits the use of the allocated frequency band, or transmits to the 3G network 3 a re-allocation request signal including information indicating the area in which the interference is detected. Accordingly, it is possible to avoid an influence of the interference due to the allocation of a part of the frequency band of the different network (allocated frequency).

It is noted that the MME 30 (management apparatus) or the MSC/VLR 60 (management apparatus) may collect, from the OAM or the base station, information indicating a state of overlapping between the coverage area of the 3G network 3 and that of the LTE network 2 in a predetermined cycle or at the timing triggered by the change of the coverage area, for example. Further, the information indicating the state of overlapping between the coverage area of the 3G network 3 and that of the LTE network 2 may be transmitted from the OAM or the base station.

Further, the base station may notify the MME 30 (management apparatus) or the MSC/VLR 60 (management apparatus) of the detection of the interference and the information on the area in which the interference has occurred, each time the interference occurs in the area in which the allocated frequency band is used. As a result, for example, the MME 30 (management apparatus) or the MSC/VLR 60 (management apparatus) is capable of updating at any time the state of overlapping between the coverage area of the 3G network 3 and that of the LTE network 2, on the basis of the information on the area in which the interference has occurred.

As described above, according to the first embodiment, the cooperation is established between the networks (RATs), and in accordance with the usage state of the frequency band in each network, it is controlled so that a part of the frequency band in one network is dynamically allocated to the other network. As a result, for example, if the PS traffic and the CS traffic tend to vary differently depending on a time and a location, it is possible to allocate a part of a radio resource of a network with a low load, to a network with a high load. Accordingly, it is possible to realize an efficient radio resource utilization.

Second Embodiment

A second embodiment will be described with a focus on a difference from the first embodiment, below. In the second embodiment, an entity (management apparatus) capable of collecting and monitoring traffic information on the network in cooperation is introduced to the mobile communication system. The entity manages the traffic information of each of the networks and dynamically executes the frequency-band allocation process.

(2-1) System Configuration

Figure 11:
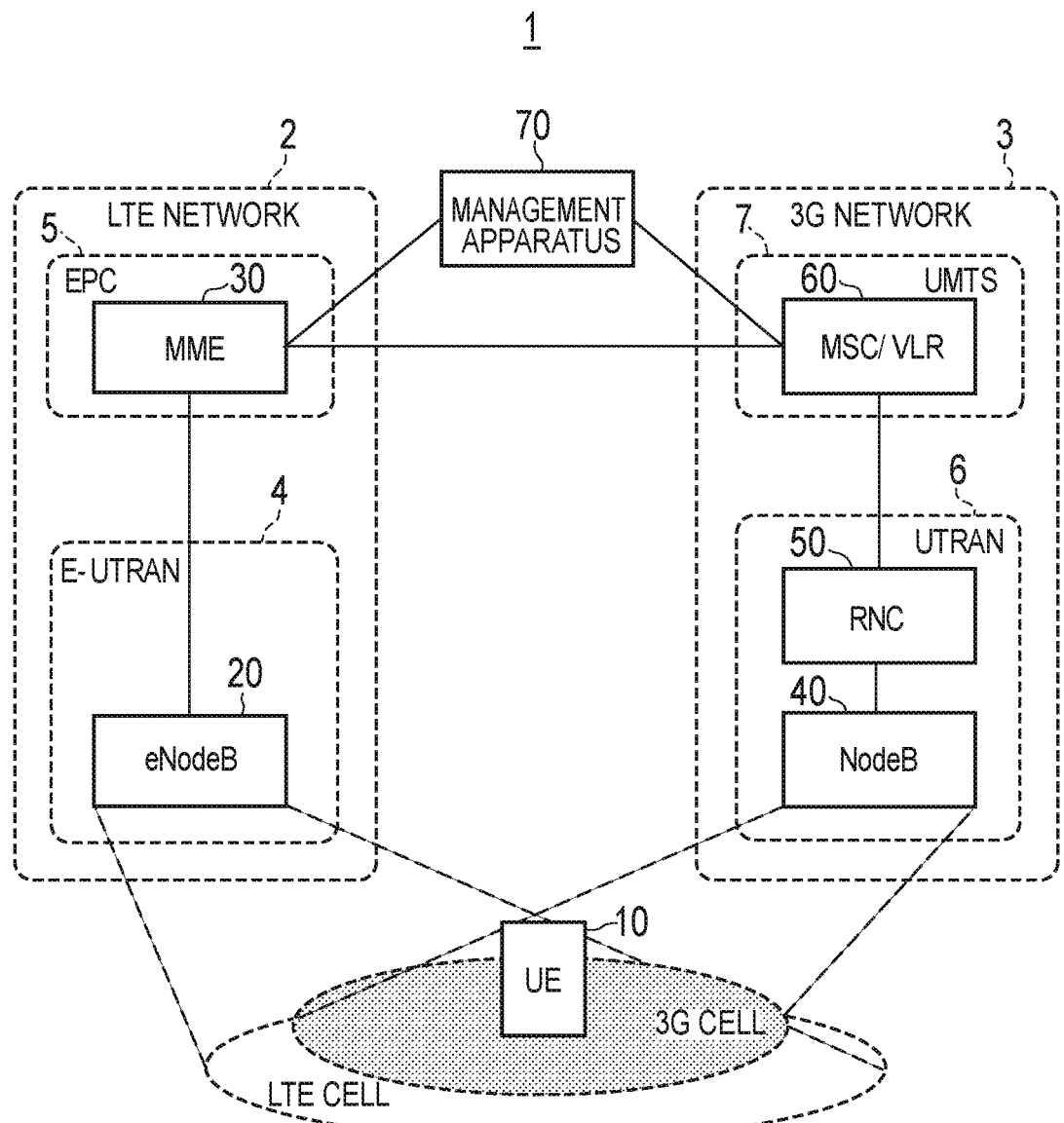
FIG. 11 is a diagram for describing an operation overview of a mobile communication system according to a second embodiment.

FIG. 11 is a configuration diagram of a mobile communication system according to the second embodiment.

As illustrated in FIG. 11, in the mobile communication system according to the second embodiment, a management apparatus 70 is connected to the LTE network 2 and the 3G network 3. In the second embodiment, the MME 30 and the MSC/VLR 60 each include at least: the frequency-band management unit 33/the frequency-band management unit 63, the communication IF unit 35/the communication IF unit 65, and the storage unit 36/the storage unit 66. The function of the management apparatus is not provided. The rest of the configuration is the same as that of the mobile communication system 1 according to the first embodiment illustrated in FIG. 1.

The management apparatus 70 distributes, on the basis of the usage state of the frequency band of the LTE network 2 and that of the 3G network 3, the frequency band between a plurality of networks. The management apparatus 70 manages the allocation state and the traffic situation of the frequency band of each of the networks. The management apparatus 70 is the OAM, and the like, for example.

(2-2) Function Block
<Management Apparatus>

Figure 12:
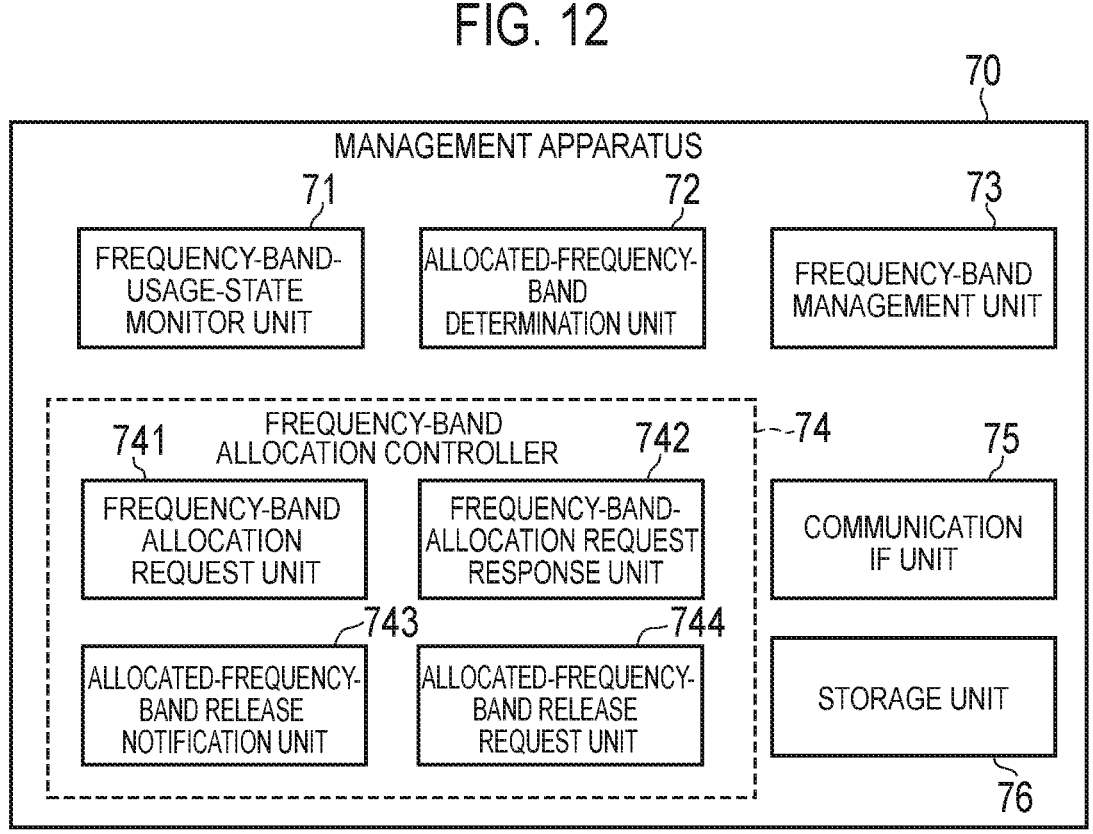
FIG. 12 is a block diagram of a management apparatus according to the second embodiment.

FIG. 12 is a block diagram of the management apparatus 70 according to the second embodiment. As illustrated in FIG. 12, the management apparatus 70 has a frequency-band-usage-state monitor unit 71, an allocated-frequency-band determination unit 72, a frequency-band management unit 73, a frequency-band allocation controller 74, a communication IF unit 75, and a storage unit 76. The frequency-band allocation controller 74 includes a frequency-band-allocation request unit 741, a frequency-band-allocation request response unit 742, an allocated-frequency-band release notification unit 743, and an allocated-frequency-band release request unit 744.

The allocated-frequency-band release request unit 744 requests the network allocated with the allocated frequency band to release the allocated frequency band if the bandwidth relative to the frequency band is less than a predetermined threshold value.

Each function other than the allocated-frequency-band release request unit 744 correspond to each of the above-described functions provided in the MME 30 illustrated in FIG. 3.

(2-3) Operation Sequence (Frequency-Band Allocation Process)

Figure 13:
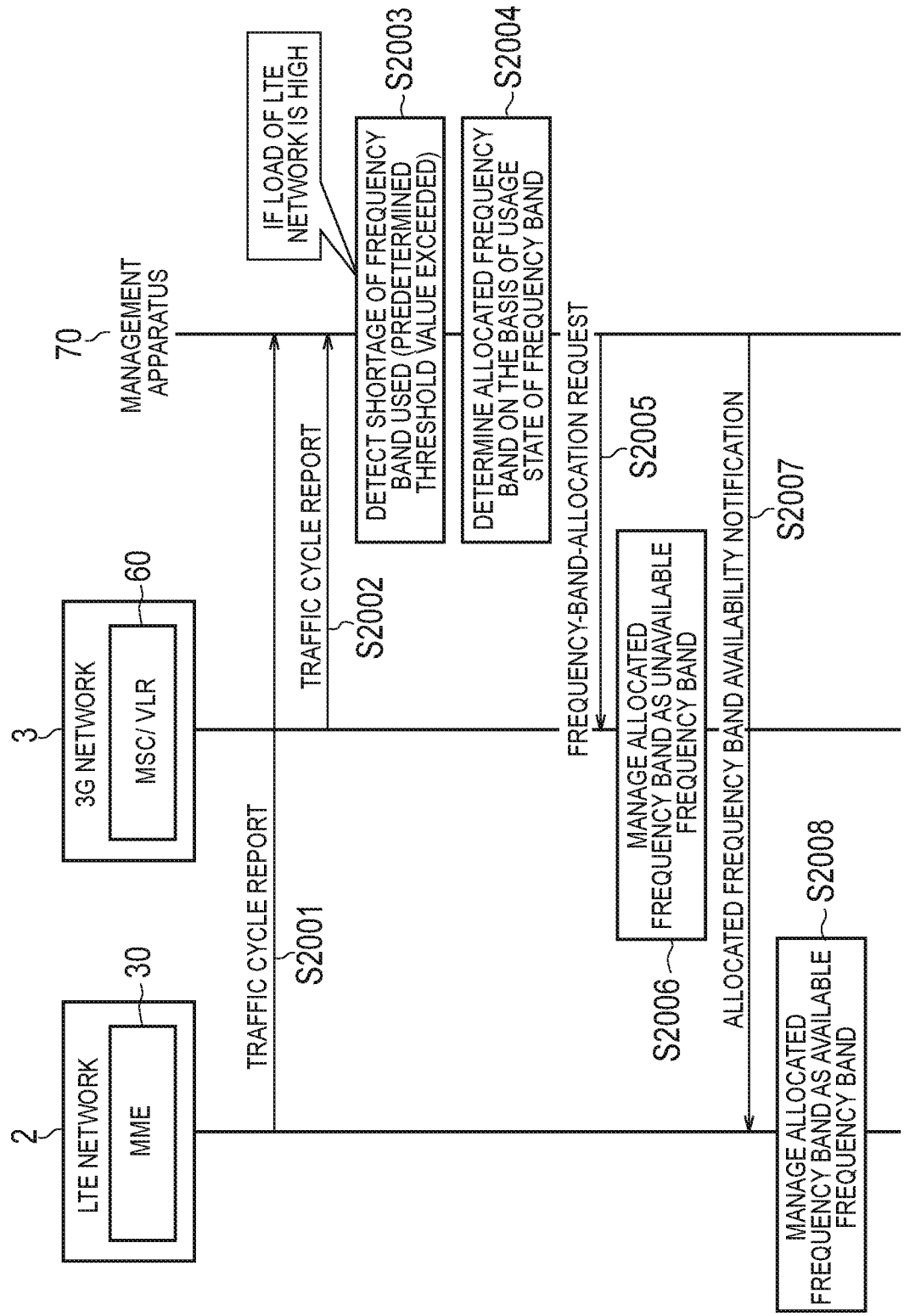
FIG. 13 is a sequence diagram illustrating an operation procedure of a frequency-band allocation process according to the second embodiment.

FIG. 13 is a sequence diagram illustrating an operation procedure of a frequency-band allocation process according to the second embodiment. In an example of FIG. 13, there is illustrated a case where the LTE network 2 that has high traffic (frequency band usage rate is high) is allocated with a part of the frequency band of the 3G network 3 that has low traffic (frequency band usage rate is low).

In step S2001 and S2002, the frequency-band-usage-state monitor unit 71 of the management apparatus 70 receives a traffic cycle report from the LTE network 2 and the 3G network 3. The traffic cycle report includes information on traffic in each network. Also, the traffic cycle report may include information indicating an area in which traffic occurs. It may be configured that the traffic cycle report is transmitted not only by the MME 30 and the MSC/VLR 60 but also by the E-UTRAN 4 and the UTRAN 6.

In step S2003, the frequency-band-usage-state monitor unit 71 detects shortage of the frequency band used in the LTE network 2. Specifically, the frequency-band-usage-state monitor unit 71 detects that the bandwidth relative to the frequency band allocated to the LTE network 2 exceeds a predetermined threshold value. The frequency-band-usage-state monitor unit 71 notifies the allocated-frequency-band determination unit 72 of the predetermined threshold value being exceeded and the usage state of the frequency band of each network.

In step S2004, the allocated-frequency-band determination unit 72 determines, on the basis of the usage states of the frequency bands allocated to the LTE network 2 and the 3G network 3, the bandwidth to be allocated to the LTE network 2 and the allocated frequency band corresponding to the bandwidth, out of the frequency bands allocated to the 3G network 3.

In step S2005, the frequency-band-allocation request unit 741 generates a frequency-band allocation request signal for requesting the 3G network 3 to allocate the determined allocated frequency band to the LTE network 2. The frequency-band-allocation request signal includes information indicating at least the allocated frequency band. The frequency-band-allocation request unit 741 transmits the generated frequency-band allocation request signal, via the communication IF unit 75, to the 3G network 3.

In step S2006, the frequency-band management unit 63 of the MSC/VLR 60 manages, as the unavailable frequency band, the allocated frequency band determined by the allocated-frequency-band determination unit 62. It may be possible that after the setting of disabling the allocated frequency band by the frequency-band management unit 63 is completed, a response (ACK) to the frequency-band allocation request signal may be transmitted to the management apparatus 70.

In step S2007, the frequency-band-allocation request response unit 742 of the management apparatus 70 transmits, to the LTE network 2, an allocated frequency band availability notification indicating that it is possible to use the allocated frequency band in the LTE network 2. The allocated frequency band availability notification includes information indicating at least the allocated frequency band.

In step S2008, the frequency-band management unit 33 of the MME 30 manages, as the frequency band available in the LTE network 2, the allocated frequency band included in the received frequency-band allocation request signal.

The above operation procedure enables the management apparatus (MME 30) to dynamically allocate a part of the frequency band of the different network (3G network 3) having a sufficient frequency band to the network (LTE network 2) in which the available frequency band is running short.

It is noted that the MME 30 (management apparatus) and the MSC/VLR 60 (management apparatus) in the example of FIG. 13 may be interchangeably operated.

(2-4) Process Procedure (Frequency-Band Allocation Process)

Figure 14:
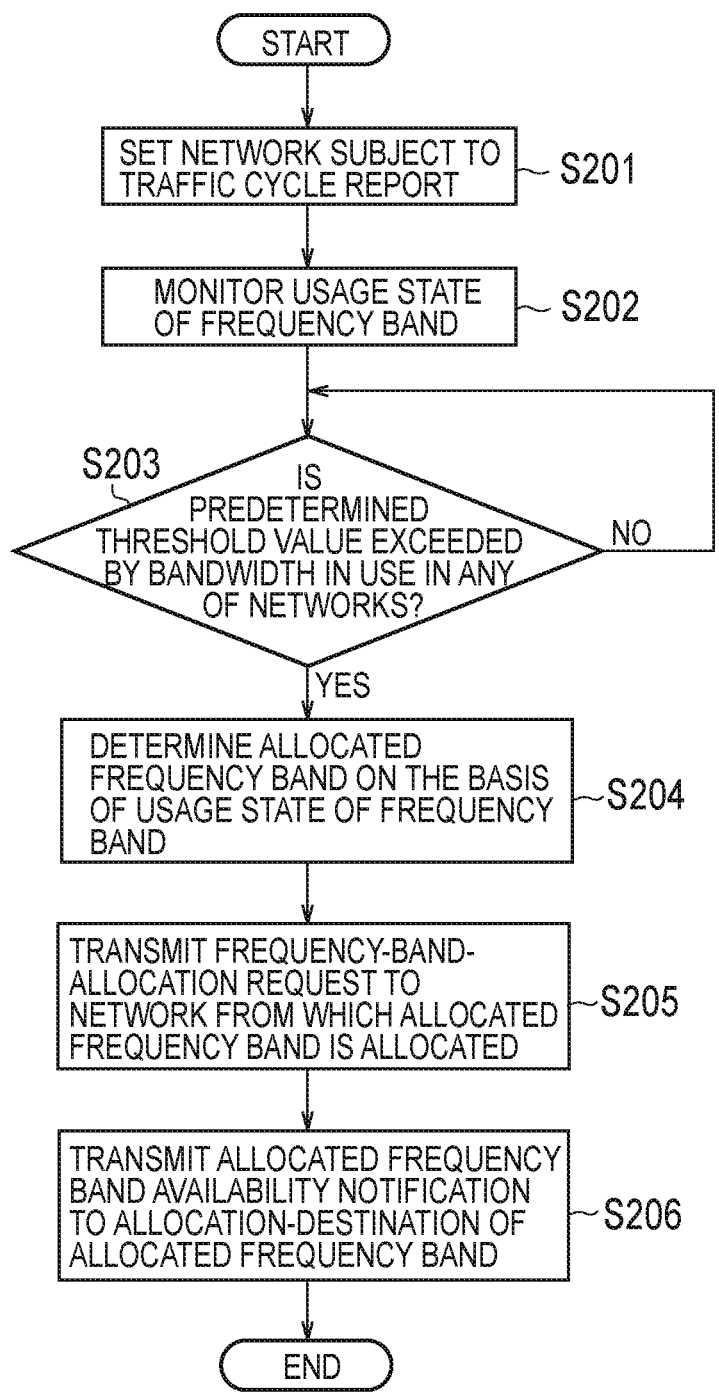
FIG. 14 is a flowchart diagram illustrating a frequency-band allocation process procedure of the management apparatus according to the second embodiment.

FIG. 14 is a flowchart diagram illustrating the frequency-band allocation process procedure by the management apparatus 70 allocating a part of the frequency band according to the second embodiment.

In step S201, the management apparatus 70 sets a network in which the traffic cycle report is executed.

In step S202, the frequency-band-usage-state monitor unit 71 checks, on the basis of traffic information included in the traffic cycle report, the usage state of the frequency band allocated to each network (e.g., the LTE network 2 and the 3G network 3).

In step S203, the frequency-band-usage-state monitor unit 71 determines whether or not the bandwidth in use in any one of the networks exceeds a predetermined threshold value.

If the bandwidth in use in any of the networks does not exceed the predetermined threshold value (NO in step S203), the process returns to step S202.

On the other hand, if the bandwidth in use in any of the networks exceeds the predetermined threshold value (YES in step S203), in step S204, the allocated-frequency-band determination unit 72 determines, on the basis of the usage state of the frequency band, the allocated frequency band.

In step S205, the frequency-band-allocation request unit 741 generates a frequency-band allocation request signal for requesting allocation of the determined allocated frequency band to the different network. The frequency-band-allocation request unit 741 transmits the generated frequency-band allocation request signal, via the communication IF unit 75, to the network from which the allocation is originated.

In step S206, the frequency-band-allocation request response unit 742 transmits, to the network to which the allocation is made, the allocated frequency band availability notification indicating that it is possible to use the allocated frequency band in the network to which the allocation is made.

(2-5) Operation Sequence (Frequency Band Release Process)

FIG. 15 is a sequence diagram illustrating an operation procedure of a frequency band release process according to the second embodiment. In an initial state of FIG. 15, the LTE network 2 is allocated with the allocated frequency band that is a part of the frequency band of the 3G network 3.

In step S2011 and S2012, the frequency-band-usage-state monitor unit 71 of the management apparatus 70 receives a traffic cycle report from the LTE network 2 and the 3G network 3.

In step S2013, the frequency-band-usage-state monitor unit 71 detects that the shortage of the frequency band used in the LTE network 2 is cleared. Specifically, the frequency-band-usage-state monitor unit 71 detects that the bandwidth relative to the frequency band allocated to the LTE network 2 has become less than a predetermined threshold value.

In step S2014, the allocated-frequency-band release request unit 744 transmits, to the LTE network 2, an allocated frequency band release request for requesting the release of the allocated frequency band.

In step S2015, the frequency-band management unit 33 of the MME 30 manages the allocated frequency band, as the frequency band unavailable in the LTE network 2.

In step S2016, the allocated-frequency-band release notification unit 743 transmits, to the 3G network 3, an allocated frequency band release notification for notifying that the allocated frequency band having been allocated to the different network (LTE network 2) has been released in the LTE network 2.

In step S2017, the frequency-band management unit 63 of the MSC/VLR 60 manages the allocated frequency band as the frequency band available in the 3G network 3.

As described above, according to the second embodiment, the management apparatus 70 controls the management of the usage state of the frequency band in a plurality of networks and the allocation of the frequency band. Thus, with the entity configured to centrally manage a plurality of networks, it is possible to achieve, as a whole network, an efficient radio resource utilization.

OTHER EMBODIMENTS

In the above-described embodiments, description was given of the dynamic allocation control of the frequency band between different networks (the LTE network and the 3G network). However, the network to which the present embodiment is applicable may be a plurality of identical networks (e.g. two LTE networks operated by different operators and the like).

The number of networks to which the present embodiment is applicable may be any number.

The allocation control of the frequency band in the present embodiment may be applied if a function such as access control by an operator is not executed at the time of an event that may locally invite high traffic such as when a disaster breaks out, for example.

Each of the above-described embodiments may be implemented independently; two or more embodiments may be combined and implemented.

INDUSTRIAL APPLICABILITY

As described above, the present application is useful in the field of mobile communication.

The invention claimed is:

1. A control method applied to a mobile communication system, comprising the steps of:
    transmitting, by a first management apparatus included in a first network allocated with a first frequency band, to a second network allocated with a second frequency band, an allocation request signal for requesting allocation of a part of the second frequency band to the first network, wherein the allocation request signal is generated on the basis of a usage state of the first frequency band, the first network and the second network are included in the mobile communication system;
    in response to receiving the allocation request signal, determining, by a second management apparatus included in the second network, on the basis of a usage state of the second frequency band, a bandwidth to be allocated to the first network out of the second frequency band and an allocated frequency band corresponding to the bandwidth;
    managing, by the second management apparatus, as unavailable, the allocated frequency band out of the second frequency band;
    transmitting, by the second management apparatus, an allocation request response signal including information indicating the allocated frequency band, to the first network; and
    managing, by the first management apparatus, on the basis of the information indicating the allocated frequency band and being included in the allocation request response signal, the allocated frequency band as available in the first network, wherein
    the usage state of the first frequency band includes a usage state of a frequency band in a first area formed by one or more cells accommodated in a first base station included in the first network, and
    the control method further comprises:
        using, by the first management apparatus, the allocated frequency band in the first area;
        detecting, by the first management apparatus, interference in the first area where the allocated frequency band is used; and
        in response to the interference being detected, transmitting, by the first management apparatus, to the second network, a re-allocation request signal including information indicating the first area where the interference is detected.

2. The control method according to claim 1, wherein the first network and the second network are each applied with a different radio access technology (RAT).

3. The control method according to claim 1, wherein the allocation request signal is generated in response to a bandwidth in use in the first frequency band exceeding a predetermined threshold value.

4. The control method according to claim 1, comprising the step of:
    transmitting, by the second management apparatus, on the basis of the usage state of the second frequency band, to the first network, an allocation availability notification indicating that a part of the second frequency band is allocatable to the first network, wherein
    the allocation request signal is generated in response to the first management apparatus receiving the allocation availability notification.

5. The control method according to claim 1, wherein the allocation request signal includes information indicating a bandwidth determined on the basis of the usage state of the first frequency band, and the allocated frequency band included in the allocation request response signal is a frequency band corresponding to the bandwidth out of the second frequency band.

6. The control method according to claim 1, wherein
the usage state of the second frequency band is a usage state of a frequency band in a second area formed by one or more cells accommodated in a second base station included in the second network,
the first area includes a plurality of first sub-areas,
the second area includes a plurality of second sub-areas,
the allocation request signal includes:
information indicating the plurality of first sub-areas, and
information indicating a frequency used in each of the plurality of first sub-areas, and
the allocated frequency band is determined, on the basis of the usage state in the second area of which at least a part geographically overlaps the first area, for each of the plurality of second sub-areas.

7. The control method according to claim 6, wherein
the allocation request signal includes information indicating the plurality of first sub-areas.

8. The control method according to claim 7, wherein
the allocation request signal is generated when the number of each of the plurality of first sub-areas where a bandwidth in use has exceeded a predetermined value exceeds a predetermined number.

9. The control method according to claim 6, wherein
the allocation request signal is generated to include information indicating an upper-layer area obtained by aggregating the plurality of first sub-areas, in response to the number of each of the plurality of first sub-areas where a bandwidth in use has exceeded a predetermined value exceeding a predetermined number.

10. The control method according to claim 6, wherein
the mobile communication system includes an external server configured to manage information indicating a geographical overlap between the first area and the second area, and
the second management apparatus checks, on the basis of the one or more information managed by the external server and indicating the geographical overlap, the usage state in the second area of which at least a part geographically overlaps the first area.

11. The control method according to claim 10, wherein
the information indicating the geographical overlap between the first area and the second area is notified from the first base station via the first management apparatus to the external server when, in the first network, interference is detected in an area in which the allocated frequency band is used.

12. The control method according to claim 6, comprising the step of:
converting, by the first management apparatus, the information indicating the first area and being included in the allocation request signal, into information interpretable by the second management apparatus, wherein
the second management apparatus checks the usage state in the second area of which at least a part geographically overlaps the first area, on the basis of the information indicating the second area and the converted information indicating the first area and being included in the allocation request signal.

13. The control method according to claim 1, wherein
the allocation request signal includes information indicating a capability of the first base station included in the first network, and the allocated frequency band is determined on the basis of the capability of the first base station.

14. The control method according to claim 1, wherein
the allocation request signal includes at least one of information indicating a capability of the first base station included in the first network and information indicating a capability of a mobile station subordinate to the one or more cells accommodated by the first base station, and
the allocated frequency band is determined on the basis of the capability of the first base station and the capability of the mobile station.

15. The control method according to claim 1, wherein
the allocated frequency band is used, in the first network, in an area around an area with a high load.

16. The control method according to claim 1, comprising the step of:
requesting, by the second management apparatus, the first network to release the allocated frequency band in the first network, on the basis of the usage state of the second frequency band, after the allocation request response signal is transmitted.

17. The control method according to claim 1, comprising the steps of:
managing, by the first management apparatus, the allocated frequency band managed as an available frequency band as unavailable, in response to a bandwidth in use in the first frequency band becoming less than a predetermined threshold value,
transmitting, by the first management apparatus, to the second network, a release notification signal indicating that the allocated frequency band is released in the first network; and
in response to receiving the release notification signal, managing, by the second management apparatus, the allocated frequency band, as available, out of the second frequency band.

18. A management apparatus comprising:
a processor and a memory coupled to the processor, the processor configured to:
manage a first frequency band allocated to a first network, wherein the first network is connected to a second network allocated with a second frequency band;
transmit, to the second network, an allocation request signal for requesting allocation of a part of the second frequency band to the first network, the allocation request signal being generated on the basis of a usage state of the first frequency band;
manage the allocated frequency band as a frequency band available in the first network, on the basis of information indicating an allocated frequency band included in an allocation request response signal, the information being transmitted as a response to the allocation request signal from the second network, wherein
the usage state of the first frequency band includes a usage state of a frequency band in a first area formed by one or more cells accommodated in a first base station included in the first network, and
the processor is further configured to
use the allocated frequency band in the first area,
detect interference in the first area where the allocated frequency band is used; and
in response to the interference being detected, transmit to the second network, a re-allocation request signal including information indicating the first area where the interference is detected.

19. A management apparatus comprising:
a processor and a memory coupled to the processor, the processor configured to:
manage a second frequency band allocated to a second network, wherein the second network is connected to a first network allocated with a first frequency band;
determine, on the basis of a usage state of the second frequency band, a bandwidth to be allocated to the first network out of the second frequency band and an allocated frequency band corresponding to the bandwidth, when receiving an allocation request signal for requesting allocation of a part of the second frequency band to the first network, the allocation request signal being transmitted from the first network;
manage the allocated frequency band, as unavailable, in the second network; and
transmit, to the first network, an allocation request response signal including information indicating the allocated frequency band, wherein
the usage state of the second frequency band includes a usage state of a frequency band in a second area formed by one or more cells accommodated in a second base station included in the second network, and
the processor is further configured to, in response to receiving a re-allocation request signal from the first network, determine, on the basis of information included in the re-allocation request signal that indicates a first area where an interference is detected, a bandwidth to be re-allocated to the first network out of the second frequency band and an re-allocated frequency band corresponding to the bandwidth to be re-allocated.

* * * * *